No. 758,335. Patented April 26, 1904.

UNITED STATES PATENT OFFICE.

ALBRECHT SCHMIDT, OF HÖCHST-ON-THE-MAIN, GERMANY, ASSIGNOR TO THE FARBWERKE, VORM. MEISTER, LUCIUS & BRÜNING, OF HÖCHST-ON-THE-MAIN, GERMANY, A CORPORATION OF GERMANY.

CELLULOID COMPOUND.

SPECIFICATION forming part of Letters Patent No. 758,335, dated April 26, 1904.

Application filed January 12, 1900. Serial No. 1,185. (No specimens.)

*To all whom it may concern:*

Be it known that I, ALBRECHT SCHMIDT, Ph. D., a citizen of the Empire of Germany, residing at Höchst-on-the-Main, Germany, have invented certain new and useful Improvements in Celluloid Compounds, of which the following is a specification.

In the manufacture of celluloid experiments looking to the substitution of the camphor heretofore employed by a cheap and inodorous equivalent have hitherto met with little practical result, for the properties required in a camphor substitute are numerous, and camphor alone has hitherto been found to include all these necessary properties. Such substances, however, which may be employed in the art referred to as a camphor substitute I have found in the derivatives of aromatic sulfonic acids of the general formula $R-SO_2.A$. In this formula, R represents an aromatic radical or its substitution product—such, for instance as phenyl, tolyl, xylyl, naphthyl, nitrophenyl, nitrotolyl, alkyloxyphenyl, &c.—and A indicates either an aliphatic or aromatic ether residue, such as oxyalkyl or residue of mono or polyvalent alcohol—for instance, $CH_3OH$, $C_2H_5OH$, $C_6H_5CH_2OH$, $CH_2(OH)-CH(OH)-CH_2(OH)$, &c.—and oxy-alphyl or residue of a mono or polyvalent phenol, such as phenol, naphthol, cresol, resorcinol, dioxydiphenylmethane, &c., or a $NH_2$ group, which, non-substituted, may be substituted once or twice—for instance, $-NH_2$, $-NHC_2H_5$, $-N(C_2H_5)_2$, $-N\begin{smallmatrix}CH_3\\C_2H_5\end{smallmatrix}$, $-NHC_6H_5$, $-N(C_2H_5)$ $C_6H_5$, $-NHCH_2.COOC_2H_5$, $-N=CH_2$, $-NHC_6H_4NH-$, $-NH.CH_2C_6H_5$, $\begin{smallmatrix}RSO_2\\RSO_2\end{smallmatrix}>NC_2H_5$, &c.

Bodies of this kind are, for instance:

Para $\overline{CH_3}.C_6H_4 \overline{-SO_2} \overline{-OC_2H_5}$ p—toluolsulfonic acid ethylester
Para $CH_3.C_6H_4 -SO_2 -OC_6H_5$ p—toluolsulfonic acid phenylester
Para $CH_3.C_6H_4 -SO_2 -NHC_2H_5$ p—toluolsulfomonoethylamid
Para $CH_3.C_6H_4 -SO_2 -NHC_6H_5$ p—toluolsulfomonophenylamid
Para $CH_3.C_6H_4 -SO_2-N\begin{smallmatrix}C_2H_5\\C_2H_5\end{smallmatrix}$ p—toluolsulfodiethylamid.

Thus, for instance, the derivatives obtained from the para-toluenesulfonic-chlorid (the by-product in the manufacture of saccharine)—such as alkyl-para-toluenesulfonate, ethyl-para-toluenesulfonate, glyceryl-para-toluenesulfonate, &c., alphyl-para-toluenesulfonate, (phenyl-para-toluenesulfonate, cresyl-para-toluenesulfonate, &c.,) para-toluenesulfonamids, such as para-toluenesulfanilid, para-toluenesulfethylanilid, and para-toluenesulfonic alkyl and dialkyl-amids—are capable alone or in mixtures of serving as a substitute for camphor. Also the derivatives obtained from disulfonic-acid chlorids are valuable. In some cases it is advisable to mix two or more of the above-named substances or in mixture with camphor, especially with such $RSO_2-A$ bodies as by themselves dissolve too little nitrocellulose and possess too great a power of crystallization—for instance, with non-substituted alphyl-sulfamids, which, when employed by themselves cannot without difficulty be worked with nitrocellulose. By this mixture of a certain percentage the power of dissolving nitrocellulose is increased and the tendency to crystallize is reduced.

The process is exactly the same as in the manufacture of celluloid, except for this difference only that the sulfo derivatives in question are wholly or partly substituted for camphor. In all these substances the group $R-SO_2-$ is characteristic for its dissolving power. Thus, for instance, instead of thirty to forty per cent. of camphor in the celluloid about thirty to forty per cent. of the sulfo derivative in question is employed, or, for instance, twenty per cent. of camphor and twenty per cent. of the sulfo derivative. Experiments were made with a great number of different substances, from which a law was deduced showing that all substances of the same class are suitable as a substitute for camphor. All of these substances belong to one and the same parent substance, the body having the power to dissolve nitrocellulose being thoughout the $SO_2$. This group is combined with group R/ the group A—for instance, an oxalkyl, (for instance, $C_6H_5SO_2OCH_3$,) in some with an oxalphyl, (for instance, $C_6H_5-SO_2OC_6H_5$,) and in some with $-NH_2$, (for instance, $C_6H_5-SO_2-NH_2$,) or with $NHC_6H_5$, (for instance, $C_6H_5SO_2-NHC_6H_5$).

The following are mentioned as some of the substances operated with:

| | Melting-point in degrees centigrade. |
|---|---|
| Benzenesulfamid | 153 |
| Para-chlorbenzenesulfamid | 144–145 |
| Para-toluenesulfamid | 137 |
| Benzenesulfethylamid | 58– 59 |
| Benzenesulfdiethylamid | 43 |
| Para-toluenesulfo-ethylamid | 58 |
| Para-toluenesulfo-diethylamid | 60– 61 |
| Acet-benzenesulfoamid | 126–127 |
| Acet-para-toluenesulfamid | 138–139 |
| Benzoyl-benzenesulfamid | 147–148 |
| Benzoyl-para-toluenesulfamid | 147–148 |
| Dibenzyl-benzenesulfamid | 68– 69 |
| Dibenzyl-para-toluenesulfamid | 115–116 |
| Dibenzyl-para-toluenesulfoimid | 171–172 |
| Dibenzenesulfo-imid | 157–158 |
| Benzenesulfanilid | 110 |
| Para-chlorbenzenesulfanilid | 105–106 |
| Dibenzyl-para-chlorbenzenesulfanilid | 143–144 |
| Para-toluenesulfanilid | 103 |
| Dibenzyl-para-toluenesulfanilid | 180–181 |
| Benzenesulfo-methylanilid | 79 |
| Benzenesulfo-ethylanilid | oil |
| Benzenesulfo-ortho-toluid | 125–126 |
| Benzenesulfo-para-toluid | 121–122 |
| Benzenesulfo-para-chloranilid | 121–122 |
| Benzenesulfo-ortho-phenetidin | 104–105 |
| Benzenesulfo-para-phenetidin | 141–142 |
| Benzenesulfo-alpha-naphthylamid | 167–168 |
| Benzenesulfo-beta-naphthylamin | 99–100 |
| Benzenesulfo-diphenylamin | 126–127 |
| Para-toluenesulfo-methylanilid | 95 |
| Para-toluenesulfo-ethylanilid | 87– 88 |
| Para-toluenesulfo-ortho-toluid | 109–110 |
| Para-toluenesulfo-para-toluid | 118–119 |
| Para-toluenesulfo-meta-xylidid | 105–106 |
| Para-toluenesulfo-para-chloranilid | 95– 96 |
| Para-toluenesulfo-ortho-phenetidin | 153–154 |
| Para-toluenesulfo-para-phenetidin | 107–108 |
| Para-toluenesulfo-alpha-naphthylamin | 157–158 |
| Para-toluenesulfo-beta-naphthylamin | 133–134 |
| Para-toluenesulfo-diphenylamin | 143–144 |
| Para-toluenesulfo-phenylhydrazin | 155–156 |
| Benzenesulfo-acidphenylether | 34– 35 |
| Para-toluenesulfo-acidphenylether | 95– 96 |
| Benzenesulfo-para-cresol | 44– 45 |
| Para-toluenesulfo-cresol | 69– 70 |
| Benzenesulfo-beta-naphthol | 106–107 |
| Para-toluenesulfonaphthol | 124–125 |
| Para-toluenesulfo-alpha-naphthol | 90– 91 |
| Para-chlorbenzenesulfo-beta-naphthol | 128–129 |
| Dibenzenesulfo-2.7-dioxynaphthalin | 122–123 |
| Di-para-toluenesulfo-2.7-dioxynaphthalin | 150–151 |
| Para-chlorbenzenesulfo-anilid | 104 |
| Para-toluenesulfamido acetic acid | 147–148 |
| Para-toluenesulfamidoethylester | 66– 67 |
| Para-toluenesulfoacidethylester | 32– 33 |
| Ortho-sulfamidobenzoic acid | 154–155 |
| Meta-sulfamidobenzoic acid | 246–247 |
| Para-sulfamidobenzoic acid | 280 |
| Ortho-sulfamidoethylester | 82– 83 |
| Para-sulfamidoamylester | 116–117 |
| Meta-sulfamidoethylester | 125–126 |
| Para-sulfamidoethylester | 110–111 |

The manufacture of the new celluloid-like compounds is effected in the same manner as is usual with camphor celluloid in other countries—for instance, by applying heat, pressure, and dissolving nitrated cellulose (pyroxylin, &c.) in one of the above-mentioned molten-camphor substitutes or by a thorough mixture with same, with or without addition of a liquid solvent hitherto used in the manufacture of celluloid—such as ethylalcohol, wood-spirit, acetone, &c.—also, for instance, by dissolving the nitrated cellulose or by allowing it to swell up in a solution of one of the above-stated camphor substitutes in ethylalcohol, wood-spirit, acetone, &c., in fact, in any liquid solvent used in the manufacture of celluloid to dissolve camphor. If it is desirable to reduce the melting-point of the camphor substitute, mixtures of several substances of the above-cited class of bodies, as well as a mixture of these bodies with camphor, may be employed. Thus, for instance, a mixture of para-toluenesulfamid and para-toluenesulfomonoethylamid.

To illustrate the above methods of making the new celluloid-like compounds, the following example is given:

Example: Pyroxylin (for instance, nitrated paper) in a condition suitable for the manufacture of celluloid is mixed with para-toluenesulfomonoethylamid, (para—$CH_3.C_6H_4 SO_2-NHC_2H_5$,) for instance, in the proportion of about sixty to forty or is allowed to swell up with an addition of ethylalcohol, wood-spirit, or acetone, &c. The mass thus treated with para-toluenesulfomonoethylamid is then further worked up in the usual manner of manufacturing celluloid—for instance, rolled out by means of a suitable roller to the thickness desired and pressed, or instead of being rolled out the mass while warm may be subjected to pressure in suitable molds and thereby forms of a desired shape obtained.

The example is the same if camphor is substituted for half of the para-toluenesulfomonoethylamid.

Any suitable known organic or inorganic admixtures may be added during the process of manufacture described for coloring or otherwise, according to the purpose they are intended for, and the forms into which the new product may be worked may of course vary from the thinnest pellicles and covers to the thickest article.

The properties of the new celluloid-like mass differ from celluloid very little, yet some of the substances have proved to be more or less suitable as a substitute for camphor.

Having thus described my invention, I claim as new and desire to secure by Letters Patent—

As a new product, a celluloid-like compound composed of a mixture of nitrocellulose and a substance containing the group $R\diagdown^{SO_2A}_{SO_2}$ wherein $R\diagdown^{SO_2}$ means an alphyl-sulfonic group linked to A, an organic radical, substantially as described.

In testimony that I claim the foregoing as my invention I have signed my name in presence of two subscribing witnesses.

ALBRECHT SCHMIDT.

Witnesses:
HEINRICH HAHN,
ALFRED BRISBOIS.